(12) United States Patent
James et al.

(10) Patent No.: US 11,392,652 B2
(45) Date of Patent: Jul. 19, 2022

(54) INTELLIGENT DIAGNOSIS AND RESOLUTION OF DOCUMENT PROCESSING FAILURES

(71) Applicant: BANK OF AMERICA CORPORATION, Charlotte, NC (US)

(72) Inventors: Thomas Boffin James, Maharashtra (IN); Bharat Tahelram Jambani, Maharashtra (IN); Amrut Gopal Nayak, Maharashtra (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 213 days.

(21) Appl. No.: 16/180,146

(22) Filed: Nov. 5, 2018

(65) Prior Publication Data
US 2020/0142967 A1 May 7, 2020

(51) Int. Cl.
*G06F 16/93* (2019.01)
*H04N 1/00* (2006.01)
*G06N 20/00* (2019.01)

(52) U.S. Cl.
CPC ............. *G06F 16/93* (2019.01); *G06N 20/00* (2019.01); *H04N 1/00029* (2013.01)

(58) Field of Classification Search
CPC ... G06F 16/93; G06F 16/24578; G06N 20/00; G06N 5/046; H04N 1/00029

USPC ........................................................ 707/608
See application file for complete search history.

(56) References Cited

U.S. PATENT DOCUMENTS

| | | | |
|---|---|---|---|
| 5,889,896 A | 3/1999 | Meshinsky et al. | |
| 7,895,474 B2 | 2/2011 | Collins et al. | |
| 8,159,707 B2 | 4/2012 | Ferlitsch | |
| 9,002,842 B2 | 4/2015 | Ravid | |
| 9,177,303 B2 | 11/2015 | Hayduchok et al. | |
| 9,477,951 B2 | 10/2016 | Hayduchok et al. | |
| 2016/0162478 A1* | 6/2016 | Blassin | G06Q 10/06311 706/12 |
| 2017/0006135 A1* | 1/2017 | Siebel | H04L 69/40 |
| 2017/0039519 A1* | 2/2017 | Hayduchok | G06K 9/00456 |

* cited by examiner

*Primary Examiner* — Hosain T Alam
*Assistant Examiner* — Tracy M McGhee
(74) *Attorney, Agent, or Firm* — Moore & Van Allen PLLC; Nicholas C. Russell

(57) ABSTRACT

Embodiments of the invention are directed to a system, method, or computer program product for intelligence diagnosis and resolution of electronic document processing errors. As electronic documents are generated and transmitted throughout an entity, high volume segregation, classification, and indexing is needed for retention of the electronic documents. High volume processing batches are prone to locking, which disrupts and halts processing. As such, the system provides a multi layered intelligent diagnostic and resolution processing for interpretation, translation, and correction of electronic document error batch processing to eliminate lag and locking in document process retention.

17 Claims, 7 Drawing Sheets

INTELLIGENT DIAGNOSIS AND RESOLUTION OF DOCUMENT PROCESSING FAILURES

BACKGROUND

In document fulfillment services physical documents may be required for distribution to individuals on specified times. Furthermore, document fulfillment services continually monitor and manage document printing and distribution fulfillment timing for compliance. As a result, there exists a need for technological integration within a physical document fulfillment service.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address these and/or other needs by providing an innovative system, method and computer program product for an intelligence diagnosis and resolution of electronic document processing errors.

Documents are generated and received in high volumes come in from various intake channels. These documents may be physical or electronic initially and be transformed into electronic form. The documents may be received from channels such as scan, fax, email, file upload, or the like from across an entity. These documents first have to be segregated, then classified, indexed, and added to storage repository for quick retrieval through various entity applications. During high volume processing over distributed server environment, electronic document batches processed through a workflow process are prone to getting locked, transmitted to an error state reconciliation location or the like. At times batch order processing sequence can get impacted and system can skip batches causing missed batches and rework. Also in a multi-step workflow, batches can get stuck at any of the steps and pile-up the system with error batches, causing system lag and/or system overload and shutdown.

Currently, to fix errors require manual intervention including identification of such batches followed by reprocessing. A solution was required to identify these various categories of batches, retrigger failed or error batches after evaluating the condition of batches and provide a surveillance dashboard to the administrator to monitor the auto-processing carried out for such batches.

In some embodiments, the invention comprises a suit of capture products to enable various capture capabilities. All products have their own way of administering exception batches. The invention comprises a common platform is required which can interpret each tools capability and translate into a common capability layer.

In some embodiments, the invention provides an intelligent diagnostic and resolution of document processing including generation of a new error fix processing that expedites the processing and prevents pile-up, lag, or system overload to the processing system. In some embodiments, the invention comprises a translation layer which is able to interpret and translate various capture tools application programming interfaces into a common service layer and provide input to an engine which can detect such batches across various product and use a predefined learning set to auto correct the batches and retrigger batch processing. The invention includes a service layer that consist of a generic translation language for capture tools which take care of existing multiple tools and any future tools additions/deletions into the platform. The tool will also have the ability to auto correct and process the batches. A dashboard will be provided to manage multiple batches across multiple product. In some embodiments, the translation layer which connects to each product and derives a common baseline capabilities required to administer the exception batches. An automatic retrigger mechanism which can manage error batches across different products. The invention selects specific learning set to apply to failed batches and uses the service layer to communicate with the respective tools where the batch belongs. A complex understanding of different capture workflow steps was required to apply to a batch before retriggering. This algorithm is built into the surveillance tool and instrumentation dashboard for automatic re-processing.

Currently there is no system available to configure multiple administration tools and provide auto correction of failed batches. Current process requires manual effort to log to each product and change the priority of batch, retrigger error batch, or the like.

Embodiments of the invention relate to systems, methods, and computer program products for intelligent diagnosis and resolution of electronic document processing, the invention comprising: receiving an error batch that comprise an error to one or more electronic documents within an electronic document processing batch; translating an application programming interface data language of the error batch from the capture systems to a common language via a common service layer; transmitting from the common service layer to a worker processing layer for error batch processing; correcting the error batch comprising the error to one or more electronic documents via intelligent rule selection; and providing a dashboard for monitoring processing of the error batch and location of the error batch within layers.

In some embodiments, the intelligent rules selection is stored within a learning application layer and utilizes manual and machine learning from historic electronic document error for matching and correcting of current errors within the electronic documents.

In some embodiments, the invention further comprises a multi-layered intelligent diagnosis and resolution of electronic document error batch processing comprising a capture system layer, a common service layer, a worker processing layer, a learning application layer, and an off layer storage database.

In some embodiments, the invention further comprises receiving electronic documents from one or more intake channels, segregating the electronic documents and processing the electronic documents through the capture systems.

In some embodiments, the worker processing layer further comprises multiple batch processors for batch processing of error batches that have been corrected via the intelligent rules selection, wherein maintaining speed and preventing lag and locking of batch processing due to errors.

In some embodiments, the invention further comprises extracting the electronic documents from user devices across an entity network.

In some embodiments, the invention further comprises re-triggering of the intelligent rule selection upon indication of no correction to the error batch being made, wherein upon no correction to the error batch: transmitting the error batch to an origin system of the error batch; and tracking the transmission of the error batch for reconciliation.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
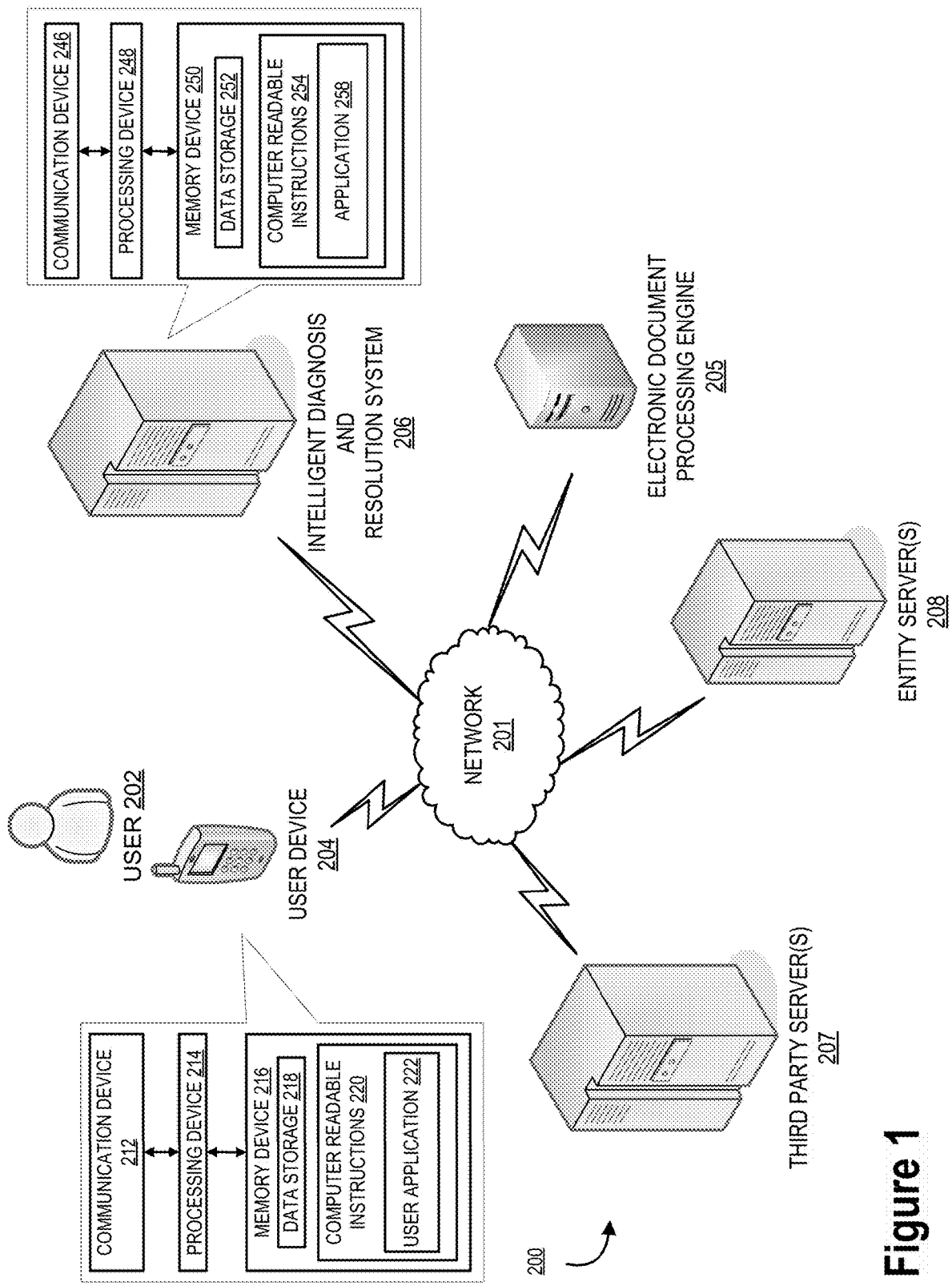
Figure 2:
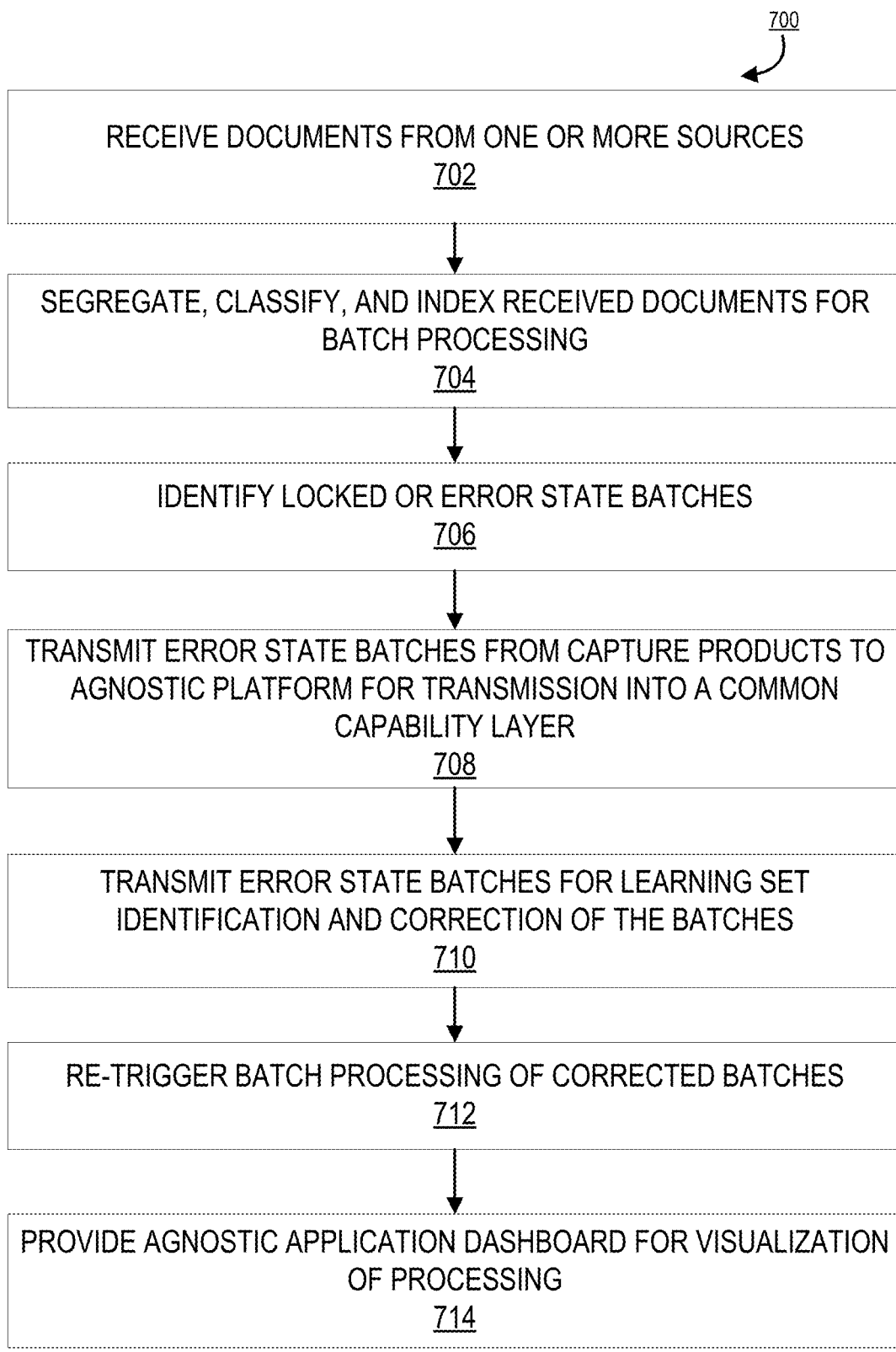
Figure 3:
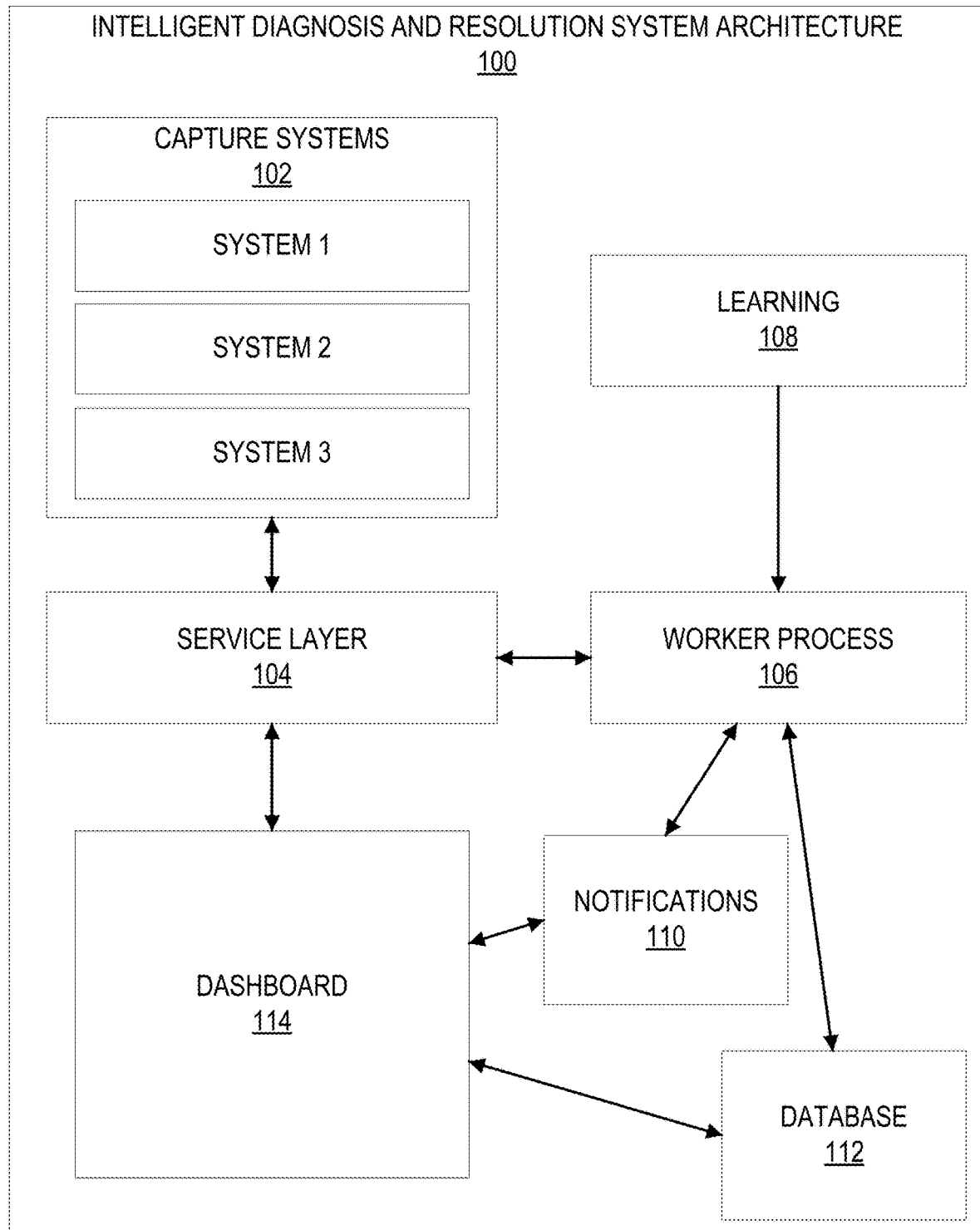
Figure 4:
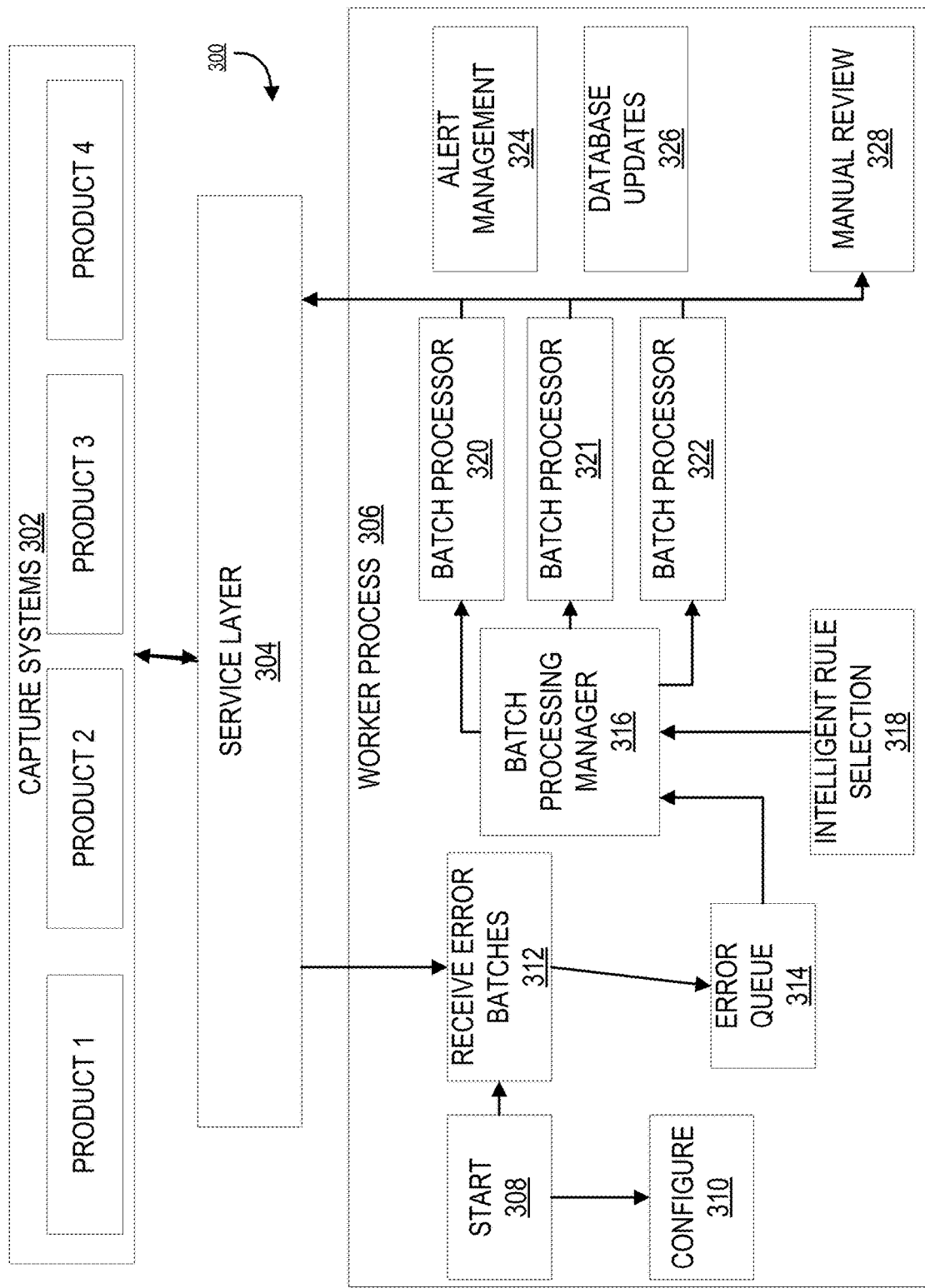
Figure 5:
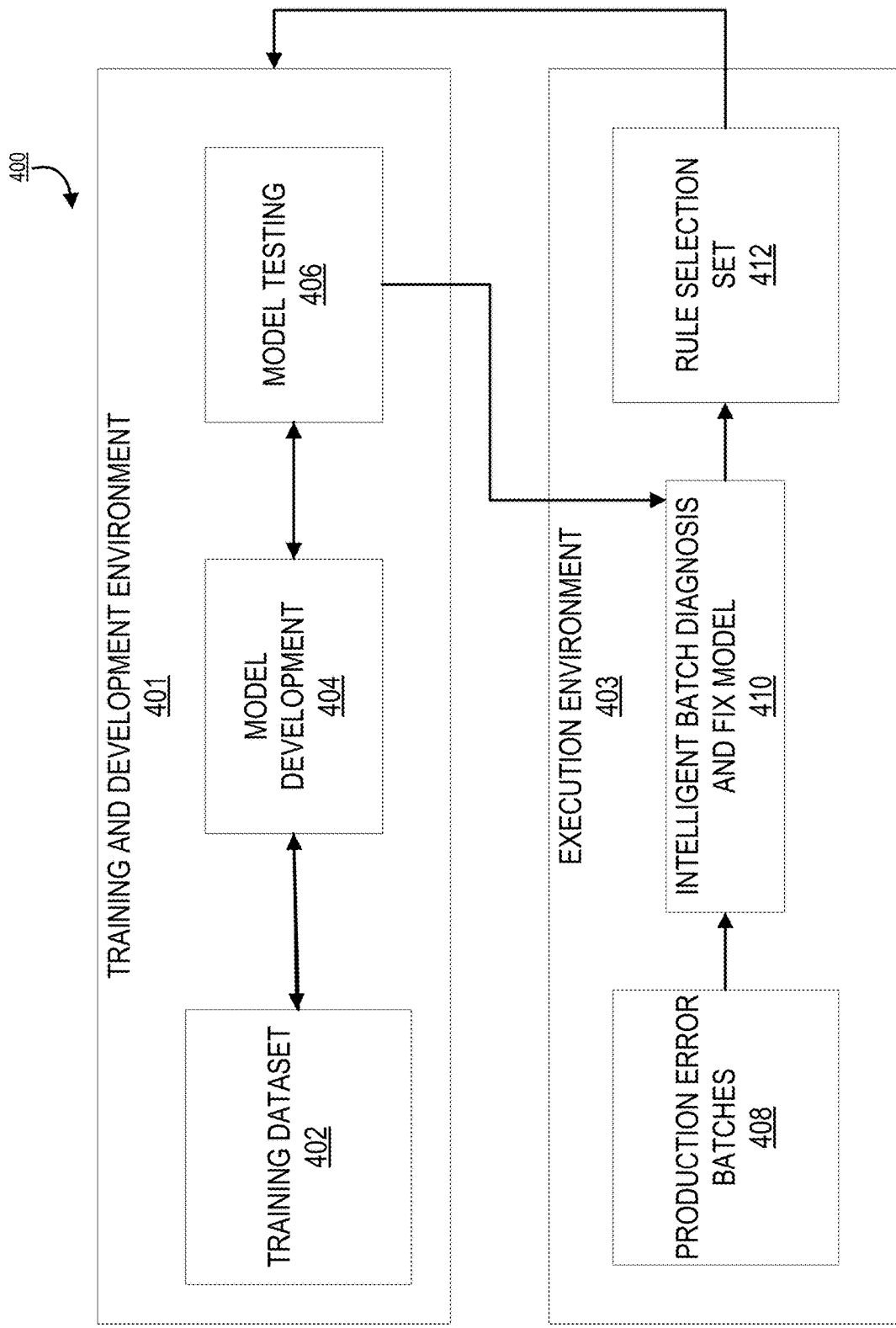
Figure 6:
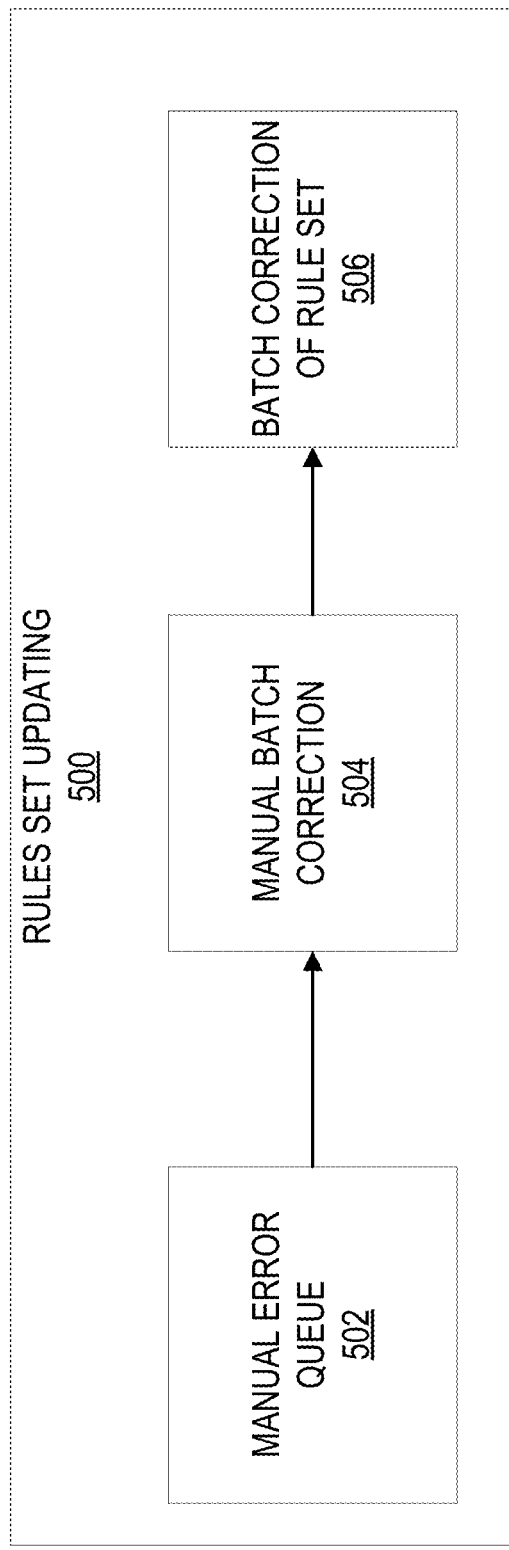
Figure 7:
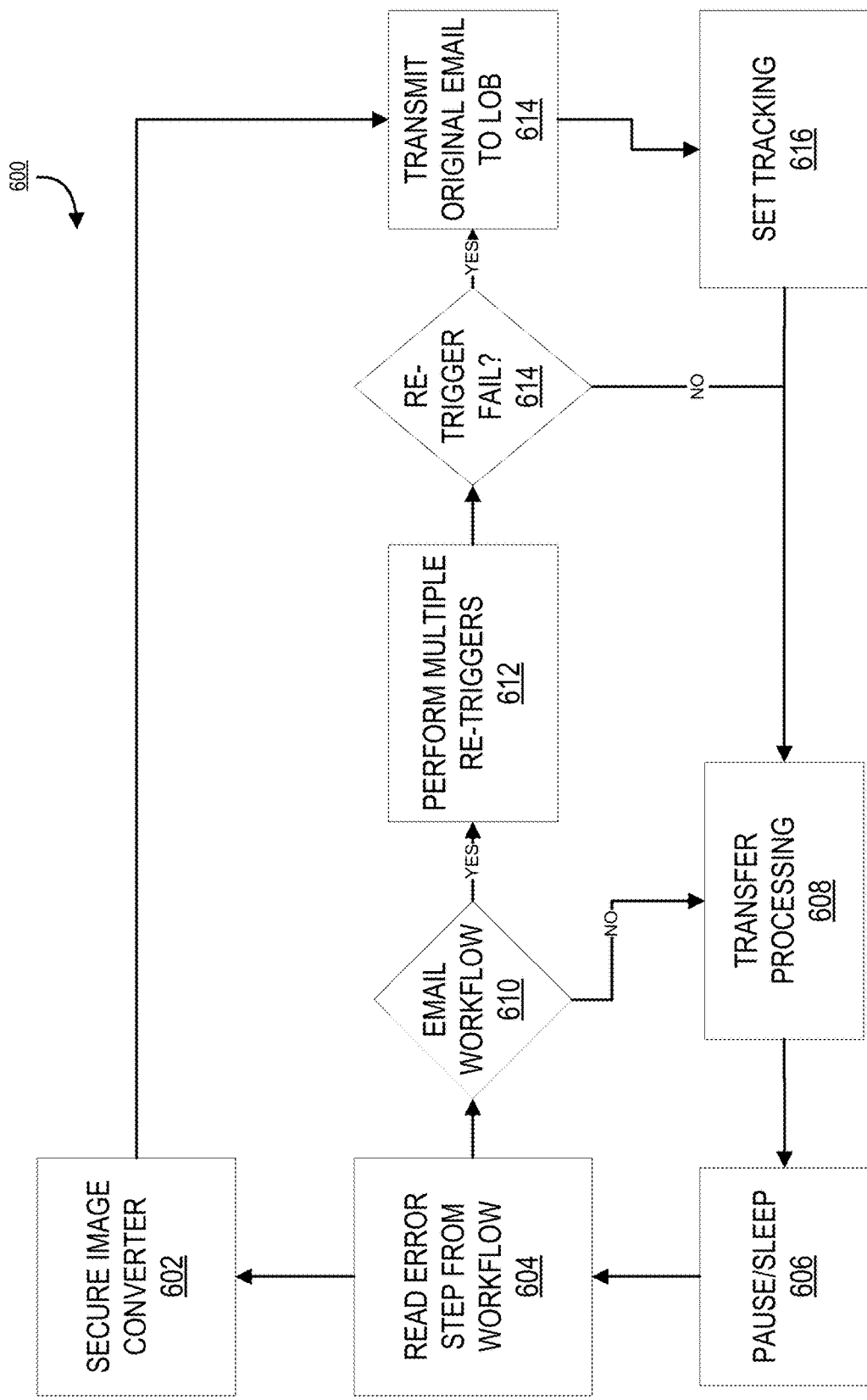

Having thus described embodiments of the invention in general terms, reference will now be made to the accompanying drawings, wherein:

FIG. 1 provides an intelligent diagnosis document processing system environment, in accordance with one embodiment of the present invention;

FIG. 2 provides a high level process flow for intelligent diagnosis document processing, in accordance with one embodiment of the present invention;

FIG. 3 provides an intelligent diagnosis and resolution system architecture, in accordance with one embodiment of the present invention;

FIG. 4 provides a detailed process flow illustrating the worker process of the intelligent diagnosis and resolution system, in accordance with one embodiment of the present invention;

FIG. 5 provides a process map illustrating machine learning lifecycle for the intelligent diagnosis and resolution system, in accordance with one embodiment of the present invention;

FIG. 6 provides a process map illustrating rules set generation and updating for the intelligent diagnosis and resolution system, in accordance with one embodiment of the present invention; and FIG. 7 provides a process map illustrating rules set triggering and alerts, in accordance with one embodiment of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

A "user" as used herein may refer to any customer of an entity or individual that interacts with an entity. In some embodiments, the user may be an entity. In some embodiments, identities of an individual may include online handles, usernames, aliases, family names, maiden names, nicknames, or the like. Furthermore, as used herein the term "user device" or "mobile device" may refer to mobile phones, personal computing devices, tablet computers, wearable devices, and/or any portable electronic device capable of receiving and/or storing data therein.

As used herein, a "user interface" generally includes a plurality of interface devices and/or software that allow a customer to input commands and data to direct the processing device to execute instructions. For example, the user interface may include a graphical user interface (GUI) or an interface to input computer-executable instructions that direct the processing device to carry out specific functions. Input and output devices may include a display, mouse, keyboard, button, touchpad, touch screen, microphone, speaker, LED, light, joystick, switch, buzzer, bell, and/or other user input/output device for communicating with one or more users.

A "transaction" or "resource distribution" refers to any communication between a user and the financial institution or other entity to transfer funds for the purchasing or selling of a product. A transaction may refer to a purchase of goods or services, a return of goods or services, a payment transaction, a credit transaction, or other interaction involving a user's account. In the context of a financial institution, a transaction may refer to one or more of: a sale of goods and/or services, initiating an automated teller machine (ATM) or online banking session, an account balance inquiry, a rewards transfer, an account money transfer or withdrawal, opening a bank application on a user's computer or mobile device, a user accessing their e-wallet, or any other interaction involving the user and/or the user's device that is detectable by the financial institution. A transaction may include one or more of the following: renting, selling, and/or leasing goods and/or services (e.g., groceries, stamps, tickets, DVDs, vending machine items, and the like); making payments to creditors (e.g., paying monthly bills; paying federal, state, and/or local taxes; and the like); sending remittances; loading money onto stored value cards (SVCs) and/or prepaid cards; donating to charities; and/or the like.

Documents are generated and received in high volumes come in from various intake channels. These documents may be physical or electronic initially and be transformed into electronic form. The documents may be received from channels such as scan, fax, email, file upload, or the like from across an entity. These documents first have to be segregated, then classified, indexed, and added to storage repository for quick retrieval through various entity applications. During high volume processing over distributed server environment, electronic document batches processed through a workflow process are prone to getting locked, transmitted to an error state reconciliation location or the like. At times batch order processing sequence can get impacted and system can skip batches causing missed batches and rework. Also in a multi-step workflow, batches can get stuck at any of the steps and pile-up the system with error batches, causing system lag and/or system overload and shutdown.

Currently, to fix errors require manual intervention including identification of such batches followed by reprocessing. A solution was required to identify these various categories of batches, retrigger failed or error batches after evaluating the condition of batches and provide a surveillance dashboard to the administrator to monitor the auto-processing carried out for such batches.

In some embodiments, the invention comprises a suit of capture products to enable various capture capabilities. All products have their own way of administering exception batches. The invention comprises a common platform is required which can interpret each tools capability and translate into a common capability layer.

In some embodiments, the invention provides an intelligent diagnostic and resolution of document processing including generation of a new error fix processing that expedites the processing and prevents pile-up, lag, or system overload to the processing system. In some embodiments, the invention comprises a translation layer which is able to interpret and translate various capture tools application programming interfaces into a common service layer and provide input to an engine which can detect such batches across various product and use a predefined learning set to auto correct the batches and retrigger batch processing. The invention includes a service layer that consist of a generic translation language for capture tools which take care of existing multiple tools and any future tools additions/deletions into the platform. The tool will also have the ability to auto correct and process the batches. A dashboard will be provided to manage multiple batches across multiple product. In some embodiments, the translation layer which connects to each product and derives a common baseline capabilities required to administer the exception batches. An automatic retrigger mechanism which can manage error batches across different products. The invention selects specific learning set to apply to failed batches and uses the service layer to communicate with the respective tools where the batch belongs. A complex understanding of different capture workflow steps was required to apply to a batch before retriggering. This algorithm is built into the surveillance tool and instrumentation dashboard for automatic re-processing.

Currently there is no system available to configure multiple administration tools and provide auto correction of failed batches. Current process requires manual effort to log to each product and change the priority of batch, retrigger error batch, or the like.

FIG. 1 illustrates an intelligent diagnosis document processing system environment 200, in accordance with one embodiment of the present invention. FIG. 1 provides the system environment 200 for which the distributive network system with specialized data feeds associated with error diagnosis document processing. FIG. 1 provides a unique system that includes specialized servers and system communicably linked across a distributive network of nodes required to perform the functions described herein.

As illustrated in FIG. 1, the entity server 208 is operatively coupled, via a network 201 to the user device 204, electronic document processing engine 205, electronic document processing engine 205, third party servers 207, and to the intelligent diagnosis and resolution system 206. In this way, the entity server 208 can send information to and receive information from the user device 204, electronic document processing engine 205, third party servers 207, and the intelligent diagnosis and resolution system 206. FIG. 1 illustrates only one example of an embodiment of the system environment 200, and it will be appreciated that in other embodiments one or more of the systems, devices, or servers may be combined into a single system, device, or server, or be made up of multiple systems, devices, or servers.

The network 201 may be a system specific distributive network receiving and distributing specific network feeds and identifying specific network associated triggers. The network 201 may also be a global area network (GAN), such as the Internet, a wide area network (WAN), a local area network (LAN), or any other type of network or combination of networks. The network 201 may provide for wireline, wireless, or a combination wireline and wireless communication between devices on the network 201.

In some embodiments, the user 202 is an individual or entity that has one or more user devices 204 and is receiving or distributing documents from a financial institution. In some embodiments, the user 202 has a user device, such as a mobile phone, tablet, computer, or the like. FIG. 1 also illustrates a user device 204. The user device 204 may be, for example, a desktop personal computer, business computer, business system, business server, business network, a mobile system, such as a cellular phone, smart phone, personal data assistant (PDA), laptop, or the like. The user device 204 generally comprises a communication device 212, a processing device 214, and a memory device 216. The processing device 214 is operatively coupled to the communication device 212 and the memory device 216. The processing device 214 uses the communication device 212 to communicate with the network 201 and other devices on the network 201, such as, but not limited to the intelligent diagnosis and resolution system 206, the entity server 208, and the third party sever 207. As such, the communication device 212 generally comprises a modem, server, or other device for communicating with other devices on the network 201.

The user device 204 comprises computer-readable instructions 220 and data storage 218 stored in the memory device 216, which in one embodiment includes the computer-readable instructions 220 of a user application 222. In some embodiments, the user application 222 allows a user 202 to send and receive communications with the intelligent diagnosis and resolution system 206.

As further illustrated in FIG. 1, the intelligent diagnosis and resolution system 206 generally comprises a communication device 246, a processing device 248, and a memory device 250. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 248 is operatively coupled to the communication device 246 and the memory device 250. The processing device 248 uses the communication device 246 to communicate with the network 201 and other devices on the network 201, such as, but not limited to the entity server 208, the third party server 207, the electronic document processing engine 205, and the user device 204. As such, the communication device 246 generally comprises a modem, server, or other device for communicating with other devices on the network 201.

As further illustrated in FIG. 1, the intelligent diagnosis and resolution system 206 comprises computer-readable instructions 254 stored in the memory device 250, which in one embodiment includes the computer-readable instructions 254 of an application 258. In some embodiments, the memory device 250 includes data storage 252 for storing data related to the system environment 200, but not limited to data created and/or used by the application 258.

In one embodiment of the intelligent diagnosis and resolution system 206 the memory device 250 stores an application 258. In one embodiment of the invention, the application 258 may associate with applications having computer-executable program code. Furthermore, the intelligent diagnosis and resolution system 206, using the processing device 248 codes certain communication functions described herein. In one embodiment, the computer-executable program code of an application associated with the application 258 may also instruct the processing device 248 to perform certain logic, data processing, and data storing functions of the application. The processing device 248 is configured to use the communication device 246 to communicate with and ascertain data from one or more entity server 208, third party servers 207, electronic document processing engine 205, and/or user device 204.

As illustrated in FIG. 1, the third party server 207 is connected to the entity server 208, user device 204, electronic document processing engine 205, and intelligent diagnosis and resolution system 206. The third party server 207 has the same or similar components as described above with respect to the user device 204 and the intelligent diagnosis and resolution system 206. While only one third party server 207 is illustrated in FIG. 1, it is understood that multiple third party servers 207 may make up the system environment 200. The third party server 207 may be associated with one or more financial institutions, physical mail carriers, weather centers, product providers, marketers, regulators, resource allocators, and the like.

As illustrated in FIG. 1, the electronic document processing engine 205 is connected to the entity server 208, user device 204, third party server 207, and intelligent diagnosis and resolution system 206. The electronic document processing engine 205 has the same or similar components as described above with respect to the user device 204 and the intelligent diagnosis and resolution system 206. While only one electronic document processing engine 205 is illustrated in FIG. 1, it is understood that multiple electronic document processing engine 205 may make up the system environment 200. The electronic document processing engine 205 may comprise a separate twin artificial intelligence (AI) engine continually monitors factors for deployment of physical documents. As such, this serves as a proxy to conscious decisions making process assessing the future deployment of physical documents to the user.

As illustrated in FIG. 1, the entity server 208 is connected to the third party server 207, user device 204, electronic document processing engine 205, and intelligent diagnosis and resolution system 206. The entity server 208 may be associated with the intelligent diagnosis and resolution system 206. The entity server 208 has the same or similar components as described above with respect to the user device 204 and the intelligent diagnosis and resolution system 206. While only one entity server 208 is illustrated in FIG. 1, it is understood that multiple entity server 208 may make up the system environment 200. It is understood that the servers, systems, and devices described herein illustrate one embodiment of the invention. It is further understood that one or more of the servers, systems, and devices can be combined in other embodiments and still function in the same or similar way as the embodiments described herein. The entity server 208 may generally include a processing device communicably coupled to devices as a memory device, output devices, input devices, a network interface, a power source, one or more chips, and the like. The entity server 208 may also include a memory device operatively coupled to the processing device. As used herein, memory may include any computer readable medium configured to store data, code, or other information.

The memory device may include volatile memory, such as volatile Random Access Memory (RAM) including a cache area for the temporary storage of data. The memory device may also include non-volatile memory, which can be embedded and/or may be removable. The non-volatile memory may additionally or alternatively include an electrically erasable programmable read-only memory (EEPROM), flash memory or the like.

The memory device may store any of a number of applications or programs which comprise computer-executable instructions/code executed by the processing device to implement the functions of the entity server 208 described herein.

Documents are generated and received in high volumes come in from various intake channels. These documents may be physical or electronic initially and be transformed into electronic form. The documents may be received from channels such as scan, fax, email, file upload, or the like from across an entity. These documents first have to be segregated, then classified, indexed, and added to storage repository for quick retrieval through various entity applications. During high volume processing over distributed server environment, electronic document batches processed through a workflow process are prone to getting locked, transmitted to an error state reconciliation location or the like. At times batch order processing sequence can get impacted and system can skip batches causing missed batches and rework. Also in a multi-step workflow, batches can get stuck at any of the steps and pile-up the system with error batches, causing system lag and/or system overload and shutdown.

Currently, to fix errors require manual intervention including identification of such batches followed by reprocessing. A solution was required to identify these various categories of batches, retrigger failed or error batches after evaluating the condition of batches and provide a surveillance dashboard to the administrator to monitor the auto-processing carried out for such batches.

In some embodiments, the invention comprises a suit of capture products to enable various capture capabilities. All products have their own way of administering exception batches. The invention comprises a common platform is required which can interpret each tools capability and translate into a common capability layer.

In some embodiments, the invention provides an intelligent diagnostic and resolution of document processing including generation of a new error fix processing that expedites the processing and prevents pile-up, lag, or system overload to the processing system. In some embodiments, the invention comprises a translation layer which is able to interpret and translate various capture tools application programming interfaces into a common service layer and provide input to an engine which can detect such batches across various product and use a predefined learning set to auto correct the batches and retrigger batch processing. The invention includes a service layer that consist of a generic translation language for capture tools which take care of existing multiple tools and any future tools additions/deletions into the platform. The tool will also have the ability to auto correct and process the batches. A dashboard will be provided to manage multiple batches across multiple product. In some embodiments, the translation layer which connects to each product and derives a common baseline capabilities required to administer the exception batches. An automatic retrigger mechanism which can manage error batches across different products. The invention selects specific learning set to apply to failed batches and uses the service layer to communicate with the respective tools where the batch belongs. A complex understanding of different capture workflow steps was required to apply to a batch before retriggering. This algorithm is built into the surveillance tool and instrumentation dashboard for automatic re-processing.

Currently there is no system available to configure multiple administration tools and provide auto correction of failed batches. Current process requires manual effort to log to each product and change the priority of batch, retrigger error batch, or the like.

FIG. 2 provides a high level process flow for intelligent diagnosis document processing 700, in accordance with one embodiment of the present invention. As illustrated in block 702, the process 700 is initiated by receiving documents from one or more sources. The documents may include any electronic correspondence, document, page, notification, or the like that may pass through the entity. The documents may be physical or electronic documents. The physical documents may be converted to an electronic document prior intelligent diagnosis and resolution of document processing failures initiate.

Next, as illustrated in block 704, the process 700 continues by segregating, classifying, and indexing the received documents for batch processing. In this way, the system classifies each document, such as an email, communication, financial document, or the like and indexes the received documents for batch processing.

During the batch processing process, the system may identify locked or error state batches, as illustrated in block 706. The errors may include the document isn't accessible due to being password protected, a formatting failure, missing portions of an electronic document, or the like. Currently, manual intervention is required in order to further process the locked or error state batches. However, using the intelligent diagnosis and resolution of document processing failure system, the locked or error state batches may be processed without manual user intervention or delay in processing.

Next, as illustrated in block 708, the process 700 continues by transmitting the error state batches from the capture products to agnostic platform for transmission into a common capability layer within the intelligent diagnosis and resolution of document processing failure system. In this way, the capture products may include documents in various formats and compatibilities associated with that particular capture product. The system may convert the capture product format into a common format for across system access and use.

As illustrated in block 710, the error state batches are transmitted for learning set identification and correction of the batches. The learning set may include a machine learning and/or artificial intelligence processor for identifying and correcting errors that occur in the processing. The learning set is further illustrated below in FIGS. 5-6. As illustrated in block 712, the process 700 continues by re-triggering the batch processing of the corrected batches. Finally, as illustrated in block 714, the process 700 is completed by providing an agnostic application dashboard for user visualization of the processing of the error state correction.

FIG. 3 provides an intelligent diagnosis and resolution system architecture 100, in accordance with one embodiment of the present invention. As illustrated, the intelligent diagnosis and resolution system architecture includes capture systems 102. There may be one or more capture systems 102. In the embodiment illustrated in FIG. 3, capture System 1, capture System 2, and capture System 3 are represented.

These capture systems may include application programming interfaces (API) to enable various capture capabilities to capture the high volume of electronic documents coming from various locations within the entity via various intake channels, such as fax, email, scan, upload, or the like. The capture systems include capture systems for image capture, data capture, or the like. Each capture system has its own API and are typically provide by a third party system for the capture of various electronic documents. Furthermore, each capture system has their own way of administering exception batches. As such, since each capture system comprises its own API and own exception batching processing, the system provides a service layer 104 communicably linked to each of the capture systems.

The service layer 104 or translation layer provides a common platform for interpretation of each capture system and translates each capture system API and programming into a common capability for intelligent diagnosis and resolution of document processing system utilization. In this way, the service layer 104, is able to interpret and translate various capture system APIs into a common language for detection of errors across various third party administration tools.

Once the capture systems are converted to a common language, the worker process 106 may include an engine that reviews the batches of data from the capture system that are potential error batches and detects such batches across the various capture systems. The worker process 106 is further illustrated in more detail below in FIG. 4. The worker process 106 is in communication with a learning application 108. The learning application 108 comprises machine learning and artificial intelligence for learning of the various errors and triggering automatic correction of those errors for integration back into the batch process flow.

The worker process 106 may also provide notifications 110 to users via a dashboard 114 associated with the intelligent diagnosis and resolution system for user visualization of the location of batch processing and error processing. Furthermore, a databased 112 is associated with the intelligent diagnosis and resolution system for storage and data retention.

FIG. 4 provides a detailed process flow illustrating the worker process of the intelligent diagnosis and resolution system 300, in accordance with one embodiment of the present invention. As illustrated the various capture systems 302 are provided. In the embodiment illustrated in FIG. 4, these include capture systems 302 from various third parties including Product 1, Product 2, Product 3, and Product 4. These capture systems may include APIs to enable various capture capabilities to capture the high volume of electronic documents coming from various locations within the entity via various intake channels. Each capture system has its own API and are typically provide by a third party system for the capture of various electronic documents. Furthermore, each capture system has their own way of administering exception batches.

The service layer 304 or translation layer provides a common platform for interpretation of each capture system and translates each capture system API and programming into a common capability for intelligent diagnosis and resolution of document processing system utilization. In this way, the service layer 304, is able to interpret and translate various capture system APIs into a common language for detection of errors across various third party administration tools.

Once the capture systems are converted to a common language, the worker process 306 may reviews the batches of data from the capture system that are potential error batches and detects such batches across the various capture systems.

As illustrated the worker process 306 may first be configured in block 310. Configuring allows for updates of the system and configuring of various types of documents, errors, or the like the worker process 306 may encounter. As illustrated in block 308 and 310, the process is initiated when an error batch is provided via a capture system 302, through the service layer 304. In this way, each individual capture system 302 may identify an error batch within the capture system 302. Once the capture system 302 identified the error, the batch associated with the error may be transmitted to the service layer 304 for data manipulation for common language processing within the intelligent diagnosis and resolution of document processing system.

Next, as illustrated in block 314, the error batches may be queued for processing. The error batches may be transmitted to the batch processing manager, as illustrated in block 316. The batch processing manager may utilized intelligent rule selection from the learning application to perform machine learning prediction and modification to the error document within the error batch to perform a correction for the error document. The intelligent rule selection may be a part of the learning application further illustrated in FIGS. 5 and 6. The rules may be generated and applied to the error batch based on a scanning of the error document determining the type of document, type of error, and the like. The rules may be inputted into the batch processing manager 316 for automatic correction of the error and retrigger the batch processing for those error batches, as illustrated in batch processor 320, batch processor 321, and batch processor 322. The system may still comprise a back-up manual review process, as illustrated in block 328, if the error batch is not automatically triggered correction for the error from the intelligent rule selection.

The worker process 306 further includes an automatic retrigger mechanism which can manage error batches across different products via the batch processing manager 316. The batch processing manager 316 selects specific learning set to apply to failed or error batches from the intelligent rule selection 318. The batch processing manager 316 may communicate with the service layer 304 to communicate with the respective tools where the batch belongs. A complex understanding of different capture workflow steps was required to apply to a batch before retriggering. This algorithm is built into the surveillance tool and instrumentation dashboard for auto re-processing.

In some embodiments, the worker process 306, may further comprise an alert management application 324 for user visualization via an interface. Furthermore, as illustrated in block 326, the batch error worker process 306 may further comprise a database update for continually maintaining and updating the system.

FIG. 5 provides a process map illustrating machine learning lifecycle for the intelligent diagnosis and resolution system 400, in accordance with one embodiment of the present invention. In this way, the process 400 provides the intelligent rule selection and learning application with predicted rules and procedures for correcting error batches in electronic documents from one or more capture systems. The process 400 comprises a training and development environment 401 and execution environment 403 for intelligent rule selection and learning application generation. The training and development environment 401 comprises a training dataset, as illustrated in block 402. The training dataset comprises a database of labelled document errors, training tools, and triggered auto-corrections for various errors. Next, as illustrated in block 404, the training and development environment 401, further comprises model development. Model development 404 comprises development of intelligent rule section modeling and identification of the rule for selection and application for the error batch. Next, the training and development environment 401 comprises model testing to confirm the model and rule will correct the error batch for processing. The model, upon testing and approval, may be directly injected into the intelligent batch diagnosis and fix model, as illustrated in block 410.

As illustrated, FIG. 5 further comprises an execution environment for the machine learning lifecycle for the intelligent diagnosis and resolution system 400. The execution environment 403, comprise production error batches, as illustrated in block 408. In this way, the production error batch may comprise a databased or dataset of production error batches for execution. Next, the execution environment 403 further comprises an intelligent batch diagnosis and fix model, as illustrated in block 410. This includes the learning application for identification of a rule and implementation of the rule for the error batch correction. Finally, as illustrated in block 412, the process 400 is completed by generation of the rule selection set 412 for identification of a rule and implementation of the rule for the error batch correction. Finally, the process 400 further comprises a continuous feedback loop between the training and development environment 401 and the execution environment 403 for continual testing and implementation of rule sets for error batch correction.

FIG. 6 provides a process map illustrating rules set generation and updating for the intelligent diagnosis and resolution system, in accordance with one embodiment of the present invention. As illustrated, FIG. 6 provides a rules set generation and rules set updating 500 processing. In block 502, the rules set updating process 500 is initiated by accessing a manual error queue. In this way, users may have, through manual review of electronic documents, identified one or more errors in those documents. The user may place those errors in the manual error queue for later correction. As illustrated in block 504, the process continues by allowing a user to manually perform batch correction to the error document batches. The type of error and the type of correction are recorded and retained for the system learning application for subsequent automatic error batch processing when the system identifies a similar error. Finally, as illustrated in block 506, the process is finalized by performing a correction of the rule set for that particular error type. In this way the learning application may continually be modified so that rule sets for applying corrections to error batches may be continually updated.

FIG. 7 provides a process map illustrating rules set triggering and alerts 600, in accordance with one embodiment of the present invention. The process 600 is initiated by reading an error step from a workflow batch, as illustrated in block 604. In this way, the capture systems may identify an error batch and the service layer may transmit the error batch into common system language for processing via the intelligent diagnosis and resolution of document system. As illustrated in block 602, the system identifies the electronic batches and determines if the error in the batch is based on an image conversion issues. In this way, the system determines if a secured image converter issue has occurred causing the document to be flagged as an error within a batch of documents. If this is the case, the system may transmit the original document to the location within the entity that it originated from in order to request a new document or a review of the document for error correction, as illustrated in block 614.

As illustrated in block 610, if the error isn't based on a converter issue, the system determines if the error batch includes email documents or not. If the error batch is not an email, the system transfers the error batch for processing via the system, as illustrated in block 608. Once processed, the corrected batch may be reintroduced in the overall document batch processing as a corrected document and the system may perform a pause/sleep, as illustrated in block 606.

In some embodiments, the system may identify that the error document from the error batch is an email document in block 610. At that point, the system may perform multiple re-triggers, as illustrated in block 612. The system may retrigger the processing for three times prior to determining if the re-triggering failed, as illustrated in block 614. If the retriggering did not fail, the process 600 continues by performing processing on the error batch and automatically correcting the error batch, as illustrated in block 608. In this way, once processed, the corrected batch may be reintroduced in the overall document batch processing as a corrected document and the system may perform a pause/sleep, as illustrated in block 606.

In some embodiments, the retriggering may fail in block 614. If the retriggering fails, the system may transmit the original email to the entity location it originated for request for a new document or a review of the document for error correction, as illustrated in block 614. The system may track the document and the request, as illustrated in block 616, such that the error document is still accounted for and maintained for correction.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function. As such, once the software and/or hardware of the claimed invention is implemented the computer device and application-specific circuits associated therewith are deemed specialized computer devices capable of improving technology associated with the in authorization and instant integration of a new credit card to digital wallets.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a special purpose computer for the authorization and instant integration of credit cards to a digital wallet, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for intelligent diagnosis and resolution of electronic document processing, the system comprising:
    a memory device with computer-readable program code stored thereon;
    a communication device;
    a processing device operatively coupled to the memory device and the communication device, wherein the processing device is configured to execute the computer-readable program code to:
        generate a training and development environment for correction of error batches containing a database of labelled document errors, training tools, and triggered auto-corrections for identified historic error batches;
        receive an error batch that comprise an error to one or more electronic documents within an electronic document processing batch;
        translate an application programming interface data language of the error batch from the capture systems to a common language via a common service layer in an execution environment;
        transmit from the common service layer to a worker processing layer for error batch processing and learning set identification, wherein the learning set include a processor for identifying an error of the error batch and provide the error a feedback loop for a training and development environment;
        correct the error batch comprising the error to one or more electronic documents via intelligent rule selection, wherein intelligent rules selection is stored within a learning application layer and utilizes manual and machine learning from historic electronic document error for matching and correcting of current errors within the electronic documents using rule sets;
        re-trigger processing of the error batch and provide a dashboard for monitoring processing of the error batch and location of the error batch within layers;
        automatically re-trigger processing one or more times based on a failed re-trigger processing;
        determine if the error batch is based on an image conversion issue;
        based on determining that the error batch is based on the image conversion issue, transmit an original email to an entity location for request for new document for error correction based on three or more failed re-trigger processing; and
        provide the feedback loop between the training and development environment and the execution environment for continual testing and implementation of the rule sets for error batch correction.

2. The system of claim 1, further comprising a multi-layered intelligent diagnosis and resolution of electronic document error batch processing comprising a capture system layer, a common service layer, a worker processing layer, a learning application layer, and an off layer storage database.

3. The system of claim 1, further comprising receiving electronic documents from one or more intake channels, segregating the electronic documents and processing the electronic documents through the capture systems.

4. The system of claim 1, wherein the worker processing layer further comprises multiple batch processors for batch processing of error batches that have been corrected via the intelligent rules selection, wherein maintaining speed and preventing lag and locking of batch processing due to errors.

5. The system of claim 1, further comprising extracting the electronic documents from user devices across an entity network.

6. The system of claim 1, further comprising re-triggering of the intelligent rule selection upon indication of no correction to the error batch being made, wherein upon no correction to the error batch:
    transmitting the error batch to an origin system of the error batch; and
    tracking the transmission of the error batch for reconciliation.

7. A computer program product for intelligent diagnosis and resolution of electronic document processing, the computer program product comprising at least one non-transitory computer-readable medium having computer-readable program code portions embodied therein, the computer-readable program code portions comprising:
    an executable portion configured for generating a training and development environment for correction of error batches containing a database of labelled document errors, training tools, and triggered auto-corrections for identified historic error batches;
    an executable portion configured for receiving an error batch that comprise an error to one or more electronic documents within an electronic document processing batch;
    an executable portion configured for translating an application programming interface data language of the error batch from the capture systems to a common language via a common service layer in an execution environment;
    an executable portion configured for transmitting from the common service layer to a worker processing layer for error batch processing and learning set identification, wherein the learning set include a processor for identifying an error of the error batch and provide the error a feedback loop for a training and development environment;
    an executable portion configured for the error batch comprising the error to one or more electronic documents via intelligent rule selection, wherein intelligent rules selection is stored within a learning application layer and utilizes manual and machine learning from historic electronic document error for matching and correcting of current errors within the electronic documents using rule sets;
    an executable portion configured for re-triggering processing of the error batch and providing a dashboard for monitoring processing of the error batch and location of the error batch within layers;

an executable portion configured for automatically re-triggering processing one or more times based on a failed re-trigger processing;

an executable portion configured for determining if the error batch is based on an image conversion issue;

an executable portion configured for transmitting, based on determining that the error batch is based on the image conversion issue, an original email to an entity location for request for new document for error correction based on three or more failed re-trigger processing; and an executable portion configured for providing the feedback loop between the training and development environment and the execution environment for continual testing and implementation of the rule sets for error batch correction.

8. The computer program product of claim 7, further comprising an executable portion configured for a multi-layered intelligent diagnosis and resolution of electronic document error batch processing comprising a capture system layer, a common service layer, a worker processing layer, a learning application layer, and an off layer storage database.

9. The computer program product of claim 7, further comprising an executable portion configured for receiving electronic documents from one or more intake channels, segregating the electronic documents and processing the electronic documents through the capture systems.

10. The computer program product of claim 7, wherein the worker processing layer further comprises multiple batch processors for batch processing of error batches that have been corrected via the intelligent rules selection, wherein maintaining speed and preventing lag and locking of batch processing due to errors.

11. The computer program product of claim 7, further comprising an executable portion configured for extracting the electronic documents from user devices across an entity network.

12. The computer program product of claim 7, further comprising an executable portion configured for re-triggering of the intelligent rule selection upon indication of no correction to the error batch being made, wherein upon no correction to the error batch:
   transmitting the error batch to an origin system of the error batch; and
   tracking the transmission of the error batch for reconciliation.

13. A computer-implemented method for intelligent diagnosis and resolution of electronic document processing, the method comprising:
   providing a computing system comprising a computer processing device and a non-transitory computer readable medium, where the computer readable medium comprises configured computer program instruction code, such that when said instruction code is operated by said computer processing device, said computer processing device performs the following operations:
   generating a training and development environment for correction of error batches containing a database of labelled document errors, training tools, and triggered auto-corrections for identified historic error batches;
   receiving an error batch that comprise an error to one or more electronic documents within an electronic document processing batch;
   translating an application programming interface data language of the error batch from the capture systems to a common language via a common service layer in an execution environment;
   transmitting from the common service layer to a worker processing layer for error batch processing and learning set identification, wherein the learning set include a processor for identifying an error of the error batch and provide the error a feedback loop for a training and development environment;
   correcting the error batch comprising the error to one or more electronic documents via intelligent rule selection, wherein intelligent rules selection is stored within a learning application layer and utilizes manual and machine learning from historic electronic document error for matching and correcting of current errors within the electronic documents using rule sets;
   re-triggering processing of the error batch and providing a dashboard for monitoring processing of the error batch and location of the error batch within layers;
   automatically re-triggering processing one or more times based on a failed re-trigger processing;
   determining if the error batch is based on an image conversion issue;
   based on determining that the error batch is based on the image conversion issue, transmitting an original email to an entity location for request for new document for error correction based on three or more failed re-trigger processing; and
   providing the feedback loop between the training and development environment and the execution environment for continual testing and implementation of the rule sets for error batch correction.

14. The computer-implemented method of claim 13, further comprising a multi-layered intelligent diagnosis and resolution of electronic document error batch processing comprising a capture system layer, a common service layer, a worker processing layer, a learning application layer, and an off layer storage database.

15. The computer-implemented method of claim 13, further comprising receiving electronic documents from one or more intake channels, segregating the electronic documents and processing the electronic documents through the capture systems.

16. The computer-implemented method of claim 13, wherein the worker processing layer further comprises multiple batch processors for batch processing of error batches that have been corrected via the intelligent rules selection, wherein maintaining speed and preventing lag and locking of batch processing due to errors.

17. The computer-implemented method of claim 13, further comprising re-triggering of the intelligent rule selection upon indication of no correction to the error batch being made, wherein upon no correction to the error batch:
   transmitting the error batch to an origin system of the error batch; and
   tracking the transmission of the error batch for reconciliation.

* * * * *